July 25, 1950   G. A. TINNERMAN   2,516,274
FASTENING DEVICE
Filed July 17, 1947   2 Sheets-Sheet 1
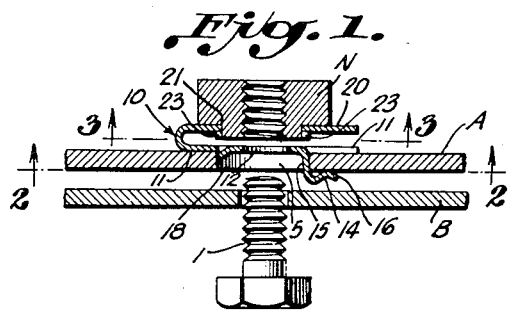
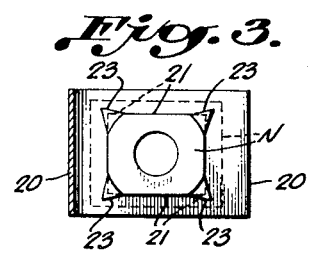
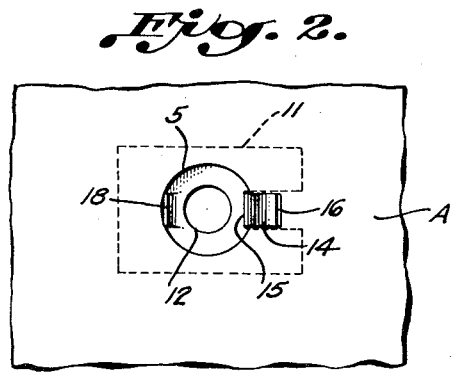
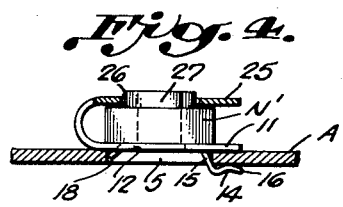
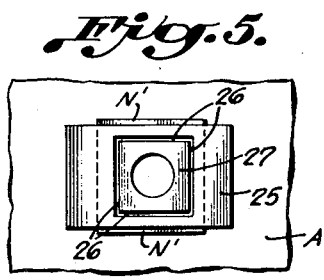
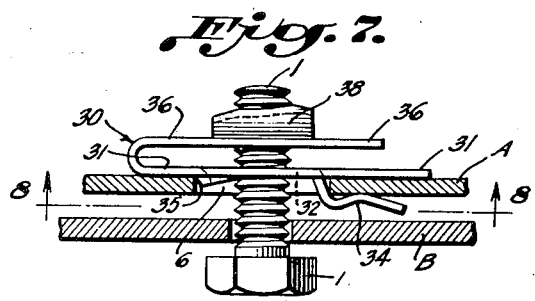
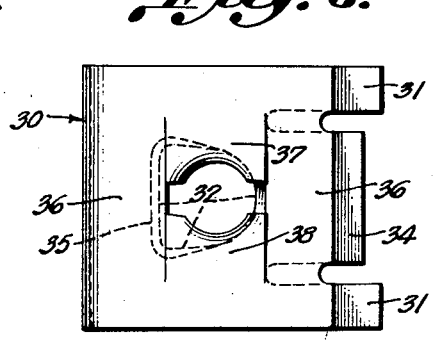
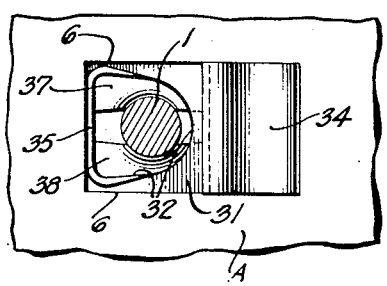
INVENTOR.
GEORGE A. TINNERMAN
BY
H. G. Lombard
ATTORNEY July 25, 1950          G. A. TINNERMAN          2,516,274

FASTENING DEVICE

Filed July 17, 1947          2 Sheets-Sheet 2

INVENTOR
GEORGE A. TINNERMAN
BY H. G. Lombard
ATTORNEY

Patented July 25, 1950

2,516,274

UNITED STATES PATENT OFFICE 2,516,274

FASTENING DEVICE

George A. Tinnerman, Cleveland, Ohio, assignor to Tinnerman Products, Inc., Cleveland, Ohio, a corporation of Ohio Application July 17, 1947, Serial No. 761,485

8 Claims. (Cl. 85—32)

This invention relates in general to nut fastened installations and deals, more particularly, with improvements in nut holding devices for attaching standard nuts, tapped plates, and the like, in fastening position in an assembly prior to the application of a cooperating bolt or screw thereto for securing the parts of the installation.

In many installations, it is necessary or desirable to use a standard nut and bolt fastening means but it is usually a difficult problem, especially in blind locations, for the operator to hold the nut in place as the bolt is applied, or otherwise, to maintain the nut against rotation during the final tightening of the bolt therewith. In most assemblies in which the rearward side of a part is not conveniently or readily accessible for holding a nut in fastening position prior to application of the bolt, it is necessary to resort to some form of riveting, welding or other attaching means for retaining the nut in fastening position.

In the average installation requiring a cheap, inexpensive nut holding means, the cost of welding, or riveting clinch-on nut holding devices, and the like, generally is so expensive as to make the use thereof prohibitive. Similarly, sheet metal, cage type of nut holding devices heretofore available are objectionably expensive and complicated, and otherwise disadvantageous in requiring an entirely inordinate amount of time for attaching the same in fastening position in an installation.

A primary object of the present invention, therefore, is to provide an improved sheet metal nut holder or retainer which is relatively simple and inexpensive to manufacture and includes in its construction a simplified, easily and quickly applied clip type of attaching means in the form of an attaching hook and cooperating locking detent, the attaching hook being adapted to clasp a part adjacent a bolt opening therein to hold the nut in attached fastening position over said bolt opening, while the cooperating detent engages a marginal portion of the bolt opening to lock the attaching hook in such attached position.

A further object of the invention is to provide various forms of nut holders embodying improved nut retaining constructions together with such attaching means comprising cooperating attaching hook and locking detent elements adapted to secure a combined nut and nut holder over the same opening in a part through which the associated bolt is passed for threadedly connecting the same with the nut member of the fastener.

Another object of the invention is to provide various forms of nut holders such as described provided with means for effecting an automatic thread locking action on the bolt in tightened fastening position.

Further objects and advantages and other new and useful features in the construction, arrangement and general combination of parts of the invention will be readily apparent as the following description proceeds with reference to the accompanying drawings, for purposes of illustration but not of limitation, in which like reference characters designate like parts throughout, and in which:

Fig. 1 is a sectional view showing one form of the improved nut and nut holder of the invention in attached position on a part with the associated bolt about to be applied thereto for completing a fastening installation;

Fig. 2 is a view along line 2—2 of Fig. 1, looking in the direction of the arrows, showing in bottom plan the part to which the improved nut and nut holder is attached over a circular bolt opening in said part; and, Fig. 3 is a sectional view along line 3—3 of Fig. 1 illustrating an arrangement for attaching the nut to the nut holder shown in Figs. 1 and 2.

Fig. 4 is a sectional view showing another form of combined nut and nut holder in accordance with the invention as applied to attached position on a part to be secured; and, Fig. 5 is a top plan view of Fig. 4 illustrating the assembly of the nut in nonrotatable relation with the nut holder in attached position.

Fig. 6 is a top plan view of a one-piece combined nut and nut holder provided with attaching means in accordance with the invention;

Fig. 7 is a sectional view of a fastening installation illustrating the combined nut and nut holder of Fig. 6 in side elevation as attached to an assembling opening in a part to be secured; and, Fig. 8 is a view along line 8—8 of Fig. 7, looking in the direction of the arrows, showing in bottom plan the part to which the combined nut and nut holder of Figs. 6 and 7 is attached over a rectangular opening in said part.

Figure 9:
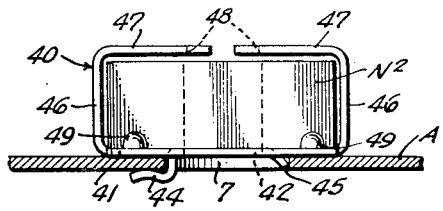
Figure 11:
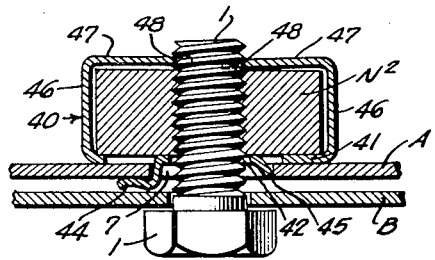
Figure 10:
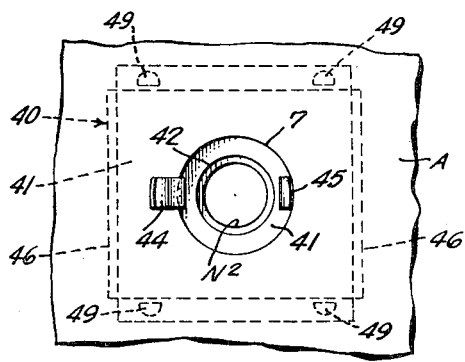
Figure 12:
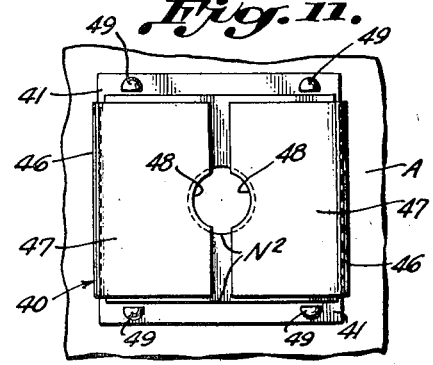
Figure 13:
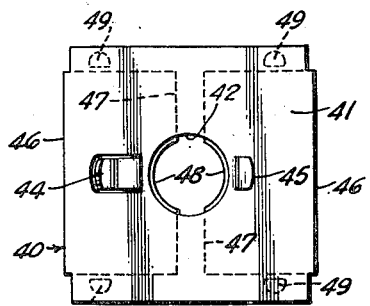
Figure 14:
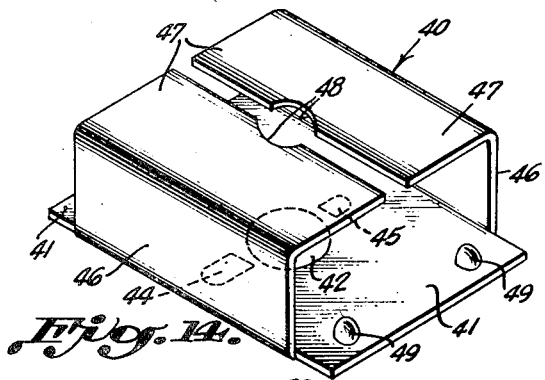

Figs. 9 to 14 inclusive illustrate a further form of combined nut and nut holder provided with attaching means in accordance with the invention together with means for effecting a positive thread locking action on the bolt, Fig. 9 showing the combined nut and nut holder in side elevation as attached over a bolt opening in a part to be secured;

Fig. 10 is a bottom plan view of Fig. 9 illustrating the attachment of the combined nut and nut holder;

Fig. 11 is a sectional view of a complete fastening installation embodying the combined nut and nut holder of Figs. 9 and 10;

Fig. 12 is a top plan view of Fig. 9 illustrating the nut and nut holder in attached position;

Fig. 13 is a bottom plan view of the nut holder per se showing the base of the fastener and the attaching means thereon; and, Fig. 14 is a perspective view of the nut holder per se shown in Figs. 9-13 inclusive.

Figure 16:
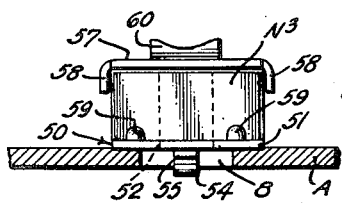
Figure 15:
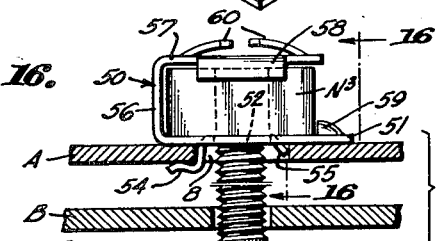
Figure 17:
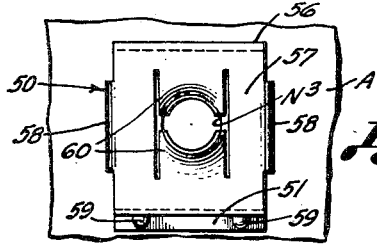

Fig. 15 is a sectional view of a fastening installation showing another form of combined nut and nut holder in attached position on a part, with a bolt fastener about to be applied to secure a cooperating part thereto;

Fig. 16 is a sectional view along line 16—16 of Fig. 15, looking in the direction of the arrows, showing the combined nut and nut holder in end elevation as attached to a supporting part; and, Fig. 17 is a top plan view of Fig. 16 showing the combined nut and nut holder in attached position and the formation of the bolt thread engaging means thereon for providing a positive thread locking action on the bolt.

In general, any form of nut holder or fastener body in accordance with the invention is readily provided from standard sheet metal strip material, preferably tempered spring metal or cold rolled metal having spring-like characteristics. The nut holding portion of the device may be provided in various forms to accommodate any selected type of nut or nut fastener together with a base portion having integral attaching means comprising an attaching hook, or the like, receivable in a bolt opening in a part to retain the nut and nut holder in attached position thereon, together with a locking detent for locking the attaching hook in such attached position.

Referring now, more particularly, to the drawings, it will be understood that the improved fastening devices of the invention are of general utility and may be readily designed for use in various installations in proportion to the size, thickness and contour of the parts secured. The fastening devices are particularly suited for providing an apertured supporting part with nut devices to which bolts or screws are applied for securing a cooperating part thereto by application entirely from one side of the installation as required in a blind location, for example. In this regard, each form of the invention embodies a nut device and attaching means comprising cooperating hook and locking detent elements for attaching the nut device easily and quickly in fixed, rigid fastening position at the rearward side of a part preparatory to the application of a bolt or screw from the outer or forward side thereof to secure said part in an installation in a minimum of time and effort. The attaching arrangement comprising the cooperating hook and locking detent elements otherwise is such that in all forms, the nut holder is readily attached over the bolt passage or other opening which is required for the bolt or screw in any event so that there is no need for any separate assembling opening or other attaching means. To this end, the attaching means comprising the cooperating hook and locking detent elements are easily applied or readily designed for attachment in a bolt passage or assembling opening of any contour whether round, rectangular or other irregular outline which is available or which is necessary or desirable to provide in the design of a part to be secured in an installation.

In the form of invention shown in Figs. 1, 2, and 3, the fastening device 10 comprises a sheet metal section which is bent to define a base portion 11 provided with the improved attaching means and a return bent spring arm 20 comprising the nut or nut carrying portion of the fastener. The letter A designates generally the part to which the fastener is attached preparatory to the application of a bolt or screw 1 for securing a cooperating part B thereto. The part A may be of any selected material such as sheet metal, wood, fibre board, or the like, but in most cases is a metallic panel or plate-like member which is provided with bolt openings 5 along the path that the object or part to be secured thereto extends in mounted position. The bolt opening 5 may be of either round, rectangular or other contour, and in the illustration of Figs. 1 to 3 inclusive, comprises a generally circular opening somewhat larger than the diameter of the bolt 1 which is employed to secure the installation.

The nut holder 10, is constructed most economically from a relatively small, inexpensive blank of sheet metal which is best provided in the manner of a simple rectangular section severed from standard sheet metal strip stock without loss or waste of material whatsoever. The nut holder 10 may, of course, assume any desired shape or configuration but when in the form of such a rectangular section is readily formed into a compact, relatively small fastener comprising a base portion 11 and the return bent nut carrying arm 20.

The base portion 11 is provided with clip-type of attaching means in the form of cooperating hook and locking detent elements which serve to hold the combined nut and nut holder in self-retained position over the bolt opening 5 in part A preparatory to the application of the bolt 1 for securing the parts A and B together in a completed installation. A central bolt passage 12 is provided in said base portion 11 in concentric relation to the opening 5 in part A, and on either side of said passage, attaching elements are provided in the form of a hook 14 and cooperating detent 18 both stamped from said base to project from the undersurface thereof.

The hook element 14 extends outwardly from the central bolt passage 12 in generally parallel and spaced relation to the base 11 of the fastener and defines a shoulder 15 immediately adjacent its junction to said base. The general spacing of the hook 14 from the fastener base 11, in its normal untensioned relation, is slightly less than the thickness of part A adjacent the bolt opening 5 and preferably the extremity thereof is bent into an outwardly inclined lip 16 defining an enlarged entrance to the space between said hook and the base 11 which facilitates the initial application of the hook to clasping relation with a marginal portion of the opening 5 in part A. The locking detent 18 may be of any suitable design and preferably is provided by a small slit portion which is pressed out of the plane of the base 11 such that the free end of the detent presents a relatively sharp shoulder or abutment adapted to engage the side wall of the opening 5 in opposing relation to the hook 14. The engaging point of the detent 18, accordingly, is spaced from the shoulder portion 15 of the hook 14 a distance substantially equal to or slightly less than that between opposing walls of the opening 5 so as to be disposed in abutting relation with the side wall of said opening in attached position.

The nut N may be of any suitable type which is riveted, welded, or otherwise secured over a suitable opening in the nut carrying arm 20. In the form shown in Figs. 1 to 3 inclusive, the nut carrying arm 20 is provided with a rectangular opening 21, Fig. 3, and the nut N is shown as one of standard rectangular design having on its underface projecting lugs 23 which are so spaced and designed as to be received within said opening 21 in snug engagement with the corner recesses thereof so that turning of the nut in said opening is prevented. The lugs 23 are peened or otherwise deformed so as to overlap the adjacent marginal portions of said opening 21 and thereby firmly and rigidly unite the nut N to the nut carrying arm 20 with the thread opening in the nut in aligned, concentric relation with the bolt passage 12 in the base 11 of the nut holder. Preferably the nut N, as joined to the nut carrying arm 20, is disposed in spaced relation to the base 11 of the nut holder, as shown in Fig. 1, in yieldable resilient relation thereto. This arrangement provides for axial resiliency in the mounting of the nut and when the bolt is tightened therewith, such axial resiliency causes a binding, frictional thread locking action of the thread surfaces of the nut thread with the thread surfaces on the bolt thread which prevents accidental or unintended loosening or reverse movement of the bolt from tightened fastening position in a completed installation.

The combined nut and nut holder thus provided is easily and quickly attached in a positive connection to part A over the opening 5 therein simply by inserting the attaching hook 14 in said opening 5 and sliding the fastener forward to a position in which the shoulder portion 15 on said hook is in substantial engagement with the wall of said opening and the hook itself is in firm clasping engagement with the undersurface of said part A and thereby cooperates with the fastener base 11 in engaging opposite sides of said part A to retain the fastener in attached position. The flared, downwardly inclined lip 16 on the extremity of the hook facilitates the initial application of the hook in this manner by causing a gradual camming action of the hook over the edge of opening 5 as necessary to permit said hook to be advanced to the fully attached position thereof. At this position, the locking detent 18 is also received within the opening 5 in substantial engagement with a wall portion of said opening and in opposing relation to withdrawal of the hook 14. Accordingly, the extremity of the locking detent 18 and the shoulder 15 of the attaching hook cooperate to engage opposite wall portions of the opening 5 and thereby serve to prevent endwise displacement or shifting of the fastener from attached position in said opening. The locking detent 18, in substantial abutting engagement with the adjacent wall of the opening 5, otherwise prevents any reverse movement or displacement of the hook 14 from attached position in the applied clasping relation thereof with the part A adjacent the bolt opening 5. The hook 14 in any such attached position, preferably is designed for pronounced frictional and gripping clasping engagement with the part A which is sufficient to prevent any relative turning of the combined nut and nut holder in attached position when the associated bolt or screw 1 is applied thereto and rotated to tightened fastening position. When the attaching hook and detent are attached in a rectangular bolt opening, it will be understood that the rectangular opening is of sufficient width to receive the attaching hook 14 and of a length approximating the distance between the shoulder 15 on the hook and the extremity of the detent 18. When assembled in such a rectangular opening the side edges of the hook and the detent engage the adjacent side walls of the rectangular opening to retain the fastener with increased effectiveness against relative turning or displacement.

Inasmuch as the nut N is resiliently supported by reason of the spaced relation of the nut carrying arm 20 from the base 11 of the fastener, it will be appreciated that when the bolt 1 is tightened therewith, such resiliency effects an automatic self-locking of the bolt in threaded engagement with the nut. The tightened bolt draws the nut toward clamping relation with the part A, but the nut carrying arm 20, in attempting to assume its initial normally untensioned spaced relation to the fastener base 11, exerts an axial drawing action on the nut which causes a binding, frictional engagement of the thread surfaces of the nut with the thread surfaces on the bolt, thereby providing an automatic thread locking action on the bolt which prevents loosening or reverse turning of the bolt from tightened fastening position.

Figs. 4 and 5 disclose another construction for a combined nut holder having the same general application and use as that described with reference to Figs. 1–3 inclusive. The nut holder comprises a similar base 11 provided with the cooperating attaching hook and locking detent elements 14 and 18, respectively, and an integral return bent spring arm 25 provided with an opening 26 for receiving a projecting shank 27 on the nut $N^1$. The shank 27 on the nut may be of any selected cross-section other than cylindrical and the opening 26 in the spring arm is provided in a corresponding contour so that one or more flat edges of said opening engage a flat portion on the nut shank 27 to prevent relative turning of the nut in assembled relation with the nut holder. In the present example, the nut shank 27 is substantially square, and the opening 26 in the nut holding arm 25 is of a corresponding outline to engage the flat faces of the nut shank and thereby prevent relative rotation of the nut in fastening position in an assembly as shown in Fig. 4. In this form of the invention, the nut $N^1$ may be assembled with the nut holder either prior to or after the nut holder is attached on the part A to be secured. This is accomplished simply by spreading the spring arm 25 from the base 11 of the fastener as necessary to slip said nut $N^1$ therebetween with the shank 27 on the nut received in the opening 26 in the spring arm whereupon the inherent resiliency of said spring arm 25 clasps the body of the nut against the base 11 to retain the same in assembled relation with the nut holder.

Figs. 6, 7, and 8 disclose another embodiment of the invention in the form of a one-piece fastener provided with integral nut means and attaching means comprising attaching hook and locking detent elements designed for application and use in the same general manner as the previously described forms of the invention. This form of fastener, designated generally 30, is shown as provided for attachment over a generally rectangular bolt opening 6 in the supporting part A, although it may be readily designed in a similar manner for attachment over a circular or other type of opening. The fastener comprises a plate-like base 31 provided with a central bolt passage 32 and an attaching hook 34 adjacent said passage similar to the construction of Fig. 1. The co-operating detent 35, however, is provided from a marginal portion of the bolt passage 32 in the fastener base and comprises a downwardly projecting edge portion of said passage having a shape corresponding to a flat edge of the rectangular bolt opening 6 in the part A. The detent thus defined by an edge portion of the bolt passage 32 is adapted to snap into and engage the adjacent wall of the opening 6 to lock the hook 34 in the attached position of the fastener on the part A in the same general manner as described with reference to Figs. 1 and 2.

A return bent arm 36 extends in generally parallel and spaced relation to the fastener base 31 and includes a thread opening in line with the bolt passage 32 in the fastener base. Preferably the thread opening is defined by the spaced extremities of integral thread engaging elements 37, 38, which are struck and formed from said arm 36 and designed for threadedly engaging the associated bolt 1 in the manner of a self locking nut.

The thread engaging elements 37, 38, are best provided from the sheet metal material of the arm 36 by an aperture intermediate spaced parallel slits which form cooperating tongues, or the like, having spaced extremities defining the desired thread or thread opening corresponding substantially to the root diameter of the bolt or screw for threadedly engaging the thread thereof. Said tongues 37, 38, otherwise are preferably formed to project out of the plane of the arm 36 and are bent lengthwise in substantial ogee formation to provide for the maximum strength obtainable to withstand the tightening action of the bolt or screw as it is advanced to final applied fastening position.

Such thread engaging means may be pressed, stamped, extruded, or otherwise provided on the arm 36 in any suitable form or construction so long as the same threadedly engage with the thread of the bolt or screw and, in this relation, the present invention fully contemplates the provision of such thread engaging means in various other similar and related forms, as in the manner of a keyhole type of thread opening, or a perforated protuberance which is pressed from the sheet metal and shaped to provide a helical thread or thread opening, or otherwise has the walls thereof tapped to provide a plurality of threads for threadedly engaging the bolt or screw. However, thread engaging means prepared in the form of cooperating, yieldable tongues as shown, are possessed of unusual inherent strength and will not collapse or pull through when the bolt is tightened, nor loosen under continuous strain and vibration in the installation. This takes place by reason of the fact that the sheet metal material from which such tongues are formed is of less thickness than the pitch or spacing between adjacent thread convolutions of the bolt or screw, wherefore the extremities of said tongues tend, more effectively, to move toward each other and dig into the grooves intermediate adjacent thread convolutions of the bolt when tightened and otherwise become embedded in the root of the bolt in locked, frictional fastening engagement therewith. Thus, in the present example, the tongues are shown as extending out of the plane of the arm 36 in substantial ogee formation and provided preferably with arcuately notched extremities, forming substantial biting jaws designed to cut into the root of the bolt and the adjacent thread surfaces thereon in positive locking relation therewith in the most effective manner. It is to be understood, however, that this embodiment of the invention is not limited in any manner or form to the illustrated construction of the thread engaging means 37, 38, but rather, comprehends also, various other similar and related forms of such tongues or equivalent thread engaging elements.

The fastener provided with any form of such integral thread engaging means has a further thread locking action with the bolt in tightened fastening position by reason of the spaced relation of the spring arm 36 to the base 31 of the fastener. When the bolt is tightened in threaded engagement with the tongues 37, 38, the arm 36 is urged toward the fastener base 31 from its initially spaced relation thereto. The arm 36 is thus biased under constant spring tension and in attempting to assume its initial untensioned spaced relation to the base 31, exerts a pronounced axial force on the tongues 37, 38, to increase the binding, frictional, thread locking engagement thereof with the engaged thread convolutions on the bolt.

Figs. 9–14 inclusive illustrate another form of the invention in which the nut holder comprises attaching hook and locking detent elements for attaching the fastener on a part to be secured in the same general manner as the previously described forms of the invention and includes, additionally, means providing a positive thread locking action on the bolt in tightened fastening position. The nut holder, designated generally 40, comprises a base 41 provided with a bolt passage 42 and a struck out attaching hook 44 together with a cooperating detent 45 which are designed for application to the opening 7 in part A to attach the nut holder thereon in the same general manner as the nut holder described with reference to Figs. 1 and 2. The nut retaining means on the nut holder comprises extensions on the base 41 bent upwardly to define side walls 46 which engage opposing side faces of the $N^2$ and inwardly bent flanges 47 overlying the top of the nut to retain the same in assembled relation within the nut holder. The extremities of said inturned flanges 47 terminate in arcuate thread engaging portions 48 conforming to the thread on the bolt 1 for threadedly engaging the same, as shown in Fig. 11. The said arcuate thread engaging portions 48 are designed, as shown in Fig. 12, to overlap and extend slightly over marginal portions of the threaded opening in the nut in their normal untensioned relation, so that they are adapted for gripping thread locking action with the thread on the leading end portion of the bolt. The nut $N^2$ is retained in the nut holder 40 by the flanges 47 and the side walls 46 together with spaced nut retaining abutments 49 or the like, integrally formed on the base 41 of the nut holder. These nut retaining abutments are readily provided by simple slits in said base 41 with the material adjacent said slits formed into protuberances in such a way that the slit edge of a protuberance defines a sharp abutment for engaging the adjacent end face of the nut, as seen in Fig. 12, in cooperation with the side walls 46 which engage opposing side faces of the nut. The nut may be assembled with the nut holder either prior to or after the nut holder is attached on the part A to be secured simply by forcing apart the flanges 47 and the adjoining side walls 46 as necessary to snap the nut therebetween to a position in which the opposing end faces of the nut are disposed between the abutments 49.

In completing a fastening installation embodying this form of nut holder as shown in Fig. 11, the bolt 1 is applied to tightened fastening position with the nut in the usual manner, but as the leading end of the bolt passes through the nut, the bolt forces apart the arcuate thread engaging portions 48 as necessary to pass therebetween in uniform threaded engagement therewith. The action is such that said arcuate thread portions 48 exert a binding, gripping action on the bolt thread under constant spring force to provide an automatic positive, thread lock on the bolt which prevents loosening or reverse turning of the bolt from tightened fastening position.

Figs. 15, 16 and 17 disclose another form of nut holder which includes means for providing a positive thread locking action on the bolt in tightened fastening position in a manner equivalent to that just described. This form of invention is generally similar to that of Figs. 1 to 3 inclusive as respects the attaching means comprising cooperating hook and locking detent elements provided on the base of the nut holder, designated generally 50, comprises a base 51 provided with a bolt passage 52 and a struck out hook 54 together with a cooperating detent 55 which are applied to an opening 8 in part A to attach the fastener in the same general manner as described with reference to Figs. 1 and 2. An extension of the base 51 is bent into an upstanding wall 56 for engaging an end face of the nut $N^3$ and to return bent spring arm 57 overlying the top of the nut and provided with side flanges 58 extending downwardly therefrom for engaging opposing side faces of the nut. The side flanges 58 retain the nut against lateral displacement, while the upstanding end wall 56 together with abutments 59 at the opposite end of the base 51 engage end faces of the nut to hold the nut against endwise displacement from the nut holder. Preferably said abutments 59 are formed by protuberances pressed out of the plane of the base 51 adjacent slits therein, as described with reference to the embodiment of Figs. 9–14 inclusive. In the spring arm 57 overlying the top of the nut, an opening is provided for passage of the leading end of the bolt, preferably in the form of a thread opening defined by a pair of cooperating tongues 60, integrally formed on said spring arm in projecting relation thereto. Such tongues or thread locking elements 60 are generally similar to those described with reference to Figs. 6, 7, and 8, and are best provided by an opening intermediate spaced parallel slits and include arcuate thread engaging portions on their extremities as shown in Fig. 17, substantially in line with and in concentric relation to the threaded bolt hole in the nut. However, the thread engaging portions on the extremities of said projecting tongues 60 are so formed as to be disposed normally out of phase with the thread convolutions in the nut.

The nut $N^3$ may be assembled with the nut holder thus provided either prior to or after the nut holder is attached on the part A simply by spreading the spring arm 57 from the fastener base 51 as necessary to snap the nut therebetween and between the downturned side flanges 58 to a position in which the inner end face of the nut is adjacent the wall 56 and the outer end face thereof is in abutting engagement with the abutments 59 on the base of the nut holder. When the bolt 1 is applied to secure an installation such as shown in Fig. 15, the leading end of the bolt is engaged in a binding thread locking action by the extremities of said tongues 60. The action is such that the extremities of said tongues 60, which normally are out of phase with the bolt thread, as aforesaid, are forced into phase therewith when the bolt is threaded therebetween. The tongues 60, accordingly, are biased from their normal untensioned relation and consequently are under continuously effective spring tension in such thread engagement with the bolt thread and therefore, provide a constant, positive thread locking effect on the bolt thread which prevents loosening or reverse turning of the bolt from tightened fastening position.

The nut holder in any form preferably is constructed of relatively thin sheet metal, the thickness of which is selected according to service requirements and the predetermined size of the parts secured. The fasteners are most effective when provided of spring metal suitably spring tempered and otherwise treated to give the desired toughness and hardness. A cheap but effective fastener may be provided from cold rolled metal, such as cold rolled steel, which is untempered but of a spring metal nature and capable of providing a strong, durable and reliable fastening means in accordance with the invention.

While the invention has been described in detail with specific examples, such examples are intended as illustrations only since it will be apparent that other modifications in the construction, arrangement and general combination of parts may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning, and range of equivalency of the claims intended to be embraced therein.

What is claimed is:

1. A fastener comprising a nut and a sheet metal body carrying said nut including a base underlying the nut and having a passage for a bolt applied to said nut, and attaching means for attaching said base over a bolt hole in a part with the bolt passage therein and in the nut in line with said bolt hole, said attaching means comprising a permanently formed hook depending from the undersurface of the fastener base at a point completely removed from said bolt passage therein and adapted to pass through said bolt hole to clasping relation with said part outside of said bolt hole, and a detent also projecting from the undersurface of the fastener base and engageable with said part to retain said attaching hook in attached position.

2. A fastener comprising a nut and a sheet metal body carrying said nut including a base underlying the nut and having a pasage for a bolt applied to said nut, and attaching means for attaching said base over a bolt hole in a part with the bolt passage therein and in the nut in line with said bolt hole, said attaching means comprising a permanently formed hook entirely removed from said bolt passage in the fastener base and adapted to pass through said bolt hole to clasping relation with said part outside of said bolt hole, and a detent also projecting from the undersurface of the fastener base and engageable with the wall of said bolt hole to retain said attaching hook against withdrawal from attached position.

3. A fastener comprising a nut and a sheet metal body carrying said nut including a base underlying the nut and having a passage for a bolt applied to said nut, and attaching means for attaching said base over a bolt hole in a part with the bolt passage therein and in the nut in line with said bolt hole, said attaching means comprising a permanently formed hook struck from a portion of said base completely removed from said bolt passage therein, said hook extending in projecting relation to the undersurface of said base and being adapted to pass through said bolt hole to clasping relation with said part outside of said bolt hole, and a detent struck from said base in projecting relation to the undersurface thereof and engageable with the wall of said bolt hole to retain said attaching hook against withdrawal from attached position.

4. A fastener comprising a nut and a sheet metal body defining a base having a bolt passage and a return bent arm carrying the nut in spaced relation to said base so that the nut is adapted to exert an axial spring force on a threaded stud applied to the nut to provide a thread locking action on said stud, and attaching means for attaching said base over a bolt hole in a part with the bolt passage therein and in the nut in line with said bolt hole, said attaching means comprising a hook struck from a portion of said base completely removed from said bolt passage therein, said hook extending in projecting relation to the undersurface of said base and being adapted to pass through said bolt hole to clasping relation with said part outside of said bolt hole, and a detent struck from said base in projecting relation to the undersurface thereof and engageable with the wall of said bolt hole to retain said attaching hook against withdrawal from attached position.

5. A fastener comprising a sheet metal body defining a base having a bolt passage and a return bent arm overlying said base provided with an opening for securing a nut thereto, a nut having lug means received in said opening and deformed to secure the nut to said arm, and attaching means for attaching said base over a bolt hole in a part with the bolt passage therein and in the nut in line with said bolt hole, said attaching means comprising a hook struck from a portion of said base completely removed from said bolt passage therein, said hook extending in projecting relation to the undersurface of said base and being adapted to pass through said bolt hole to clasping relation with said part outside of said bolt hole, and a detent struck from said base in projecting relation to the undersurface thereof and engageable with the wall of said bolt hole to retain said attaching hook against withdrawal from attached position.

6. A fastener comprising a sheet metal body defining a base having a bolt passage and a return bent arm overlying said base provided with an opening for securing a nut thereto, a nut having lug means received in said opening and deformed to secure the nut to said arm, said arm being spaced from said base so that the nut is adapted to exert an axial spring force on a threaded stud applied to the nut to provide a thread locking action on said stud, and attaching means for attaching said base over a bolt hole in a part with the bolt passage therein and in the nut the line with said bolt hole, said attaching means comprising a hook struck from a portion of said base completely removed from said bolt passage therein, said hook extending in projecting relation to the undersurface of said base and being adapted to pass through said bolt hole to clasping relation with said part outside of said bolt hole, and a detent struck from said base in projecting relation to the undersurface thereof and engageable with the wall of said bolt hole to retain said attaching hook against withdrawal from attached position.

7. A fastener comprising a nut and a sheet metal body carrying said nut including a base underlying the nut, said base being provided with a hook and a cooperating detent spaced from said hook and having a bolt passage in the space between said hook and cooperating detent, said hook depending from said base at a point completely removed from said bolt passage.

8. A fastener comprising a nut and a sheet metal body carrying said nut including a base underlying the nut, said base being provided with a hook and a cooperating detent spaced from said hook and having a bolt passage in the space between said hook and cooperating detent, said hook being provided from the material of a portion of said base completely removed from said bolt passage therein and being bent to project from the underside of said base.

GEORGE A. TINNERMAN.

REFERENCES CITED

The following references are of record in the file of this patent:

UNITED STATES PATENTS

| Number | Name | Date |
|---|---|---|
| 991,447 | Kennedy | May 2, 1911 |
| 2,079,917 | Mitchel | May 11, 1937 |
| 2,168,721 | Tinnerman | Aug. 8, 1939 |
| 2,198,439 | Kost | Apr. 23, 1940 |
| 2,215,560 | Oddie | Sept. 24, 1940 |
| 2,274,014 | Tinnerman | Feb. 24, 1942 |
| 2,278,790 | Langmaid | Apr. 7, 1942 |
| 2,302,389 | Kost | Nov. 17, 1942 |
| 2,382,942 | Murphy | Aug. 14, 1945 |
| 2,404,372 | Hallock | July 23, 1946 |